United States Patent [19]

Shimozawa

[11] Patent Number: 5,095,477
[45] Date of Patent: Mar. 10, 1992

[54] FOCUSING CONTROL SYSTEM

[75] Inventor: Kenji Shimozawa, Musashino, Japan

[73] Assignee: TEAC Corporation, Japan

[21] Appl. No.: 278,596

[22] Filed: Dec. 1, 1988

[30] Foreign Application Priority Data

Dec. 7, 1987 [JP] Japan .............................. 62-309100

[51] Int. Cl.⁵ .............................................. G11B 7/00
[52] U.S. Cl. ................................... 369/112; 369/44.29;
369/44.23; 369/122; 250/201.5; 359/824
[58] Field of Search ..................... 369/46, 44, 45, 112,
369/44.11–44.22, 44.29, 44.24; 250/201, 202,
201.5; 350/6.8, 6.5, 436, 5 H, 6.2, 6.12, 433,
164.2, 464, 470, 466, 501; 356/3546, 35; 51/216 LP

[56] References Cited

U.S. PATENT DOCUMENTS 4,290,132  9/1981  Kotaka .............................. 369/112

FOREIGN PATENT DOCUMENTS 0079184  9/1919  Austria ................................ 350/501

Primary Examiner—Roy N. Envall, Jr.
Assistant Examiner—Thang V. Tran
Attorney, Agent, or Firm—Andrus, Sceales, Starke & Sawall

[57] ABSTRACT

A focusing control system comprises a lens system having a plano-convex lens part and a cylindrical lens part formed as a unitary body such that an optical axis of the plano-convex lens and an optical axis of the cylindrical lens coincides with an optical axis of the lens system for receiving an incident optical beam reflected by the rotary recoridng medium at its one side and for transmitting the optical beam thus received to the other side of the lens system, and a photo detector array disposed so as to receive the optical beam transmitted from the lens system. The photo detector array has a quadrant detecting plane comprising four detecting sub-planes arranged in a row and column formation, and each of the sub-planes is connected to a corresponding photo detector which produces an output electrical signal when an optical beam transmitted from the lens system is irradiated on its detecting sub-plane.

7 Claims, 6 Drawing Sheets

FOCUSING CONTROL SYSTEM

BACKGROUND OF THE INVENTION

The present invention generally relates to focusing control systems of optical recording/reproducing apparatus recording and/or reproducing an information signal on and from a rotary information recording medium by means of an optical beam, and in particular to an optical system used in such a focusing control system for focusing the optical beam on the rotary information recording medium.

An optical recording/reproducing apparatus such as a magneto-optical recording/reproducing apparatus records and/or reproduces an information signal on and from a rotary information recording medium referred to hereinafter as a disk by means of an optical beam. The optical beam is irradiated on the disk through an objective lens held in the apparatus and the disk is rotated together with a turntable which supports the disk. In such an apparatus, it is impossible to eliminate minute displacement of the disk in the upward and downward direction when the disk is rotated together with the turntable, and a proper focusing of the optical beam on a recording plane of the disk on which the information signal is recorded cannot be maintained as long as the objective lens is fixed in the apparatus. Therefore, the apparatus uses a focusing control system which maintains the focusing of the optical beam by moving the objective lens to and from the disk responsive to the distance between the objective lens and the recording plane of the disk such that the distance between the objective lens and the recording plane of the disk is maintained equal to the focal length of the objective lens. The focusing control system includes an optical system which in turn comprises a plano-convex lens held by a first holder, a cylindrical lens held by a second holder and a photo diode array having a quadrant detecting plane, and a reflected optical beam reflected by the disk is focused on the quadrant detecting plane after passing through the plano-convex lens and the cylindrical lens. The plano-convex lens and the cylindrical lens are positioned relative to the quadrant detecting plane such that the reflected optical beam reflected by the disk and received by the objective lens forms a circular beam spot on the detecting plane when the optical beam is properly focused on the disk by the objective lens. In case that the distance between the disk and the objective lens is not equal to the focal length of the objective lens and the optical beam is not properly focused on the disk, the spot of the optical beam formed on the quadrant detecting plane of the photo diode array assumes an ecliptical shape elongating in one or the other of the diagonal directions defined in the quadrant detecting plane. Responsive to the appearance of this elongated beam spot on the detecting plane, the photo diode array cooperating with the quadrant detecting plane produces an electrical output indicating that the objective lens is located too close to or too far from the recording plane of the disk This control signal is supplied to a focusing servo control system which moves the objective lens to and from the disk responsive to the electrical output produced by the photo diode array. Thus, a proper focusing of the optical beam is recovered even when the disk is displaced upwards or downwards and the focusing of the optical beam is lost.

In such a conventional focusing control system, one has to:

1) dispose the plano-convex lens, cylindrical lens and the quadrant detecting plane of the photo diode array on a single optical path such that optical axes of these elements coincide each other;

2) adjust the position of the plano-convex lens, cylindrical lens and the quadrant detecting plane such that a circular beam spot appears on the quadrant detecting plane when the optical beam irradiated on the disk via the objective lens is properly focused on the recording place of the disk; and 3) rotate the cylindrical lens about its optical axis such that the direction of elongation of the ecliptical optical beam spot on the quadrant detecting plane which appears when the proper focusing of the optical beam on the disk is lost coincides with the one or the other of the diagonal lines of the quadrant detecting plane, when assembling the optical system of the focusing control system. Here, the optical axis of the quadrant detecting plane is defined as a hypothetical axis passing through a center of four detecting windows of photo diodes arranged in a row and column formation perpendicularly to the plane of the detecting window.

In such an adjustment, it is relatively easy to establish a proper relation between a pair of optical elements such as the plano-convex lens and the cylindrical lens, the cylindrical lens and the quadrant detecting plane, or the plano-convex lens and the quadrant detecting plane. However, it is extremely difficult to adjust the relation between the plano-convex lens, the cylindrical lens, and the quadrant detecting plane in a single step. Thus, when aligning the optical axes of the plano-convex lens, cylindrical lens and the quadrant detecting plane of the optical system, the optical axes of the quadrant detecting plane and the cylindrical lens are aligned first, and then the optical axes of the cylindrical lens and the plano-convex lens are aligned. In this state, the optical axes of the quadrant detecting plane and the plano-convex lens do not generally coincide one another. Thus, it is necessary to coincide the optical axes of the plano-convex lens and the quadrant detecting plane in the following step. As the optical axes of the quadrant detecting plane and the cylindrical lens are aligned at the beginning of the adjustment, this adjustment of the quadrant detecting plane and the plano-convex lens generally may lead to the misalignment of the optical axes of the quadrant detecting plane and the cylindrical lens. Therefore, the alignment of the optical axes of the quadrant detecting plane and the cylindrical lens has to be established again, and the above procedures for achieving the alignment have to be repeated until a satisfactory alignment of the overall optical system is achieved. Similarly, the position of these optical elements are adjusted repeatedly. Further, it is necessary to adjust the orientation of the cylindrical lens such that the elongated beam spot appearing on the quadrant focusing plane of the photo detector array coincides with the direction of the diagonal line of the detecting plane. Thus, the cylindrical lens is rotated relative to the holder holding the lens and is fixed with the orientation thus established.

Thus, conventional optical system of the focusing control system used in the optical recording/reproducing apparatus has a problem that a repetitive and complex adjustment is necessary, and the assembling work is tedious and time consuming, and expensive.

SUMMARY OF THE INVENTION

Accordingly, it is a general object of the present invention to provide a novel and useful optical system of a focusing control system in which the aforementioned problems are eliminated.

Another and more specific object of the present invention is to provide an optical system of a focusing control system comprising a plano-convex lens and a cylindrical lens for passing an optical beam, and a photo diode array having a quadrant detecting plane on which the optical beam is focused, wherein the plano-convex lens and the cylindrical lens are formed as a unitary body. According to the present invention, adjustment of the optical system when assembling it is substantially simplified. More specifically, the repetitive or iterative adjustment hitherto required for achieving a proper alignment and a proper positional relationship between the optical elements such as the plano-convex lens, cylindrical lens and the quadrant detecting plane can be eliminated. Further, the optical system can be made compact as the separation between the plano-convex lens and the cylindrical lens is eliminated.

Still other objects and further features of the present invention will become apparent from the following detailed description when read in conjunction with attached drawings.

DETAILED DESCRIPTION

Figure 1A:
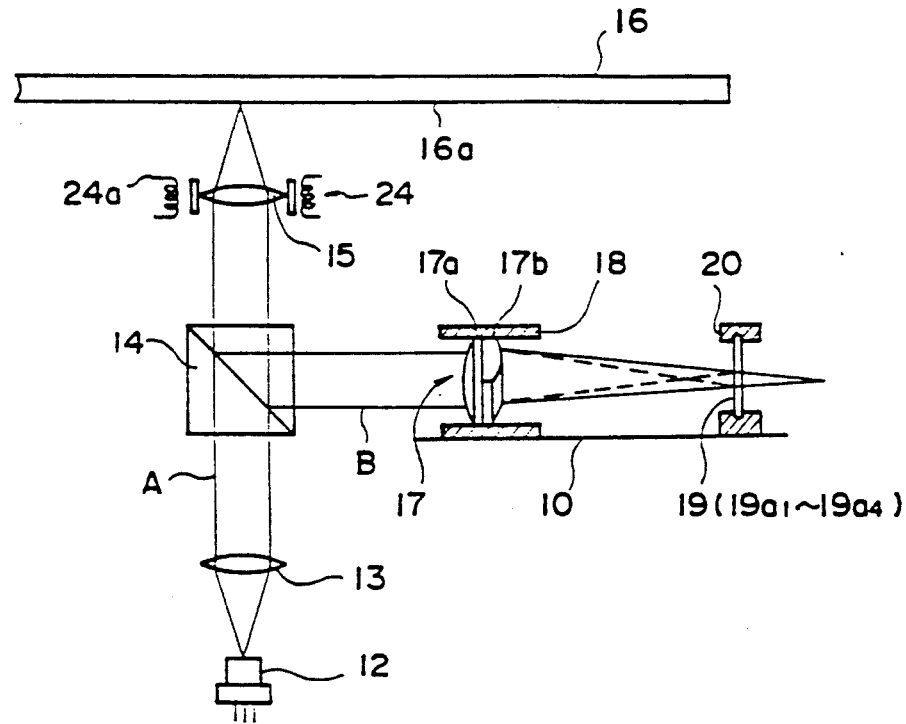
FIG. 1(A) is a schematical diagram showing the construction of the optical system of the present invention.

FIG. 1 (A) shows an overall construction of the optical system of the present invention used in an optical recording/reproducing system for achieving a proper focusing of an optical beam on an information recording disk such as an optical disk or magneto-optical disk. Referring to the drawing, an optical source such as an laser diode 12 produces an optical beam, and the optical beam is converted to a parallel optical beam A by a collimator lens 13. The parallel optical beam A is then passed through an objective lens 15 which is held on a focusing actuator 24 to be described later briefly and is focused on a recording plane 16a of an information recording disk 16 such as an optical disk or magneto-optical disk. The optical beam incident to the disk 16 is then reflected by the recording plane 16a and is returned along an identical optical path to the path of the optical beam A in a reversed direction. This reflected optical beam is then reflected by a beam splitter 14 provided in the optical path and is diverted to a direction substantially perpendicular to the optical path of the optical beam A. The optical beam thus diverted is then passed through a lens system 17 held by a holder 18. The lens system 17 comprises a plano-convex lens 17a and a cylindrical lens 17b combined as an integral body. Finally, the optical beam is focused on a quadrant detecting plane 19 of a photo diode array. The quadrant detecting plane 19 is held by a holder 20 and comprises four substantially square planes $19a_1$–$19a_4$ which form the light receiving or detecting windows of the photo diode array arranged in a row and column formation. The holders 19 and 20 are mounted on a chassis 10 generally illustrated in FIG. 1.

Figure 1B:
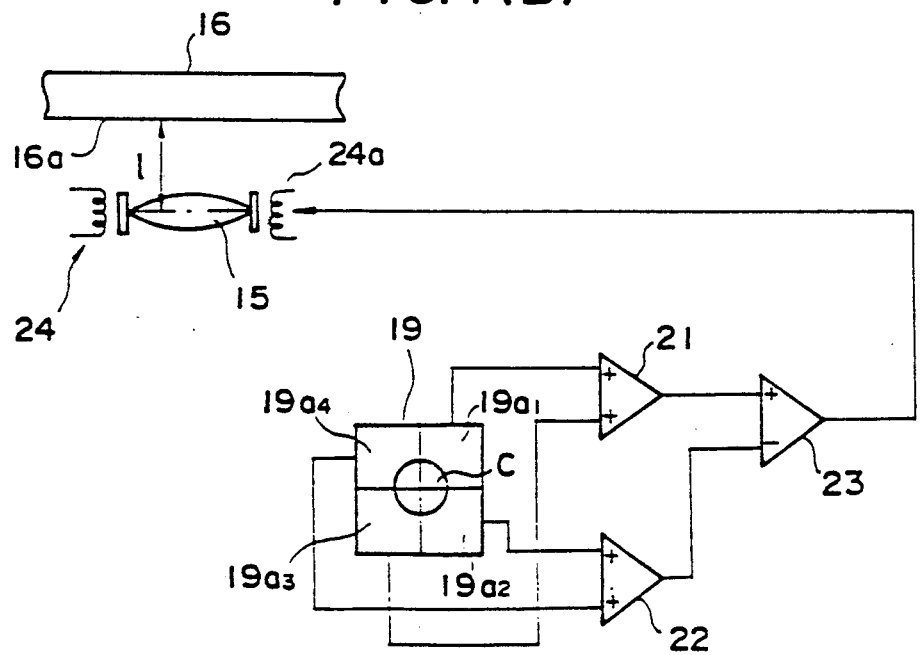
FIG. 1(B) is a block diagram showing an electrical system cooperating with the optical system of FIG. 1(A)

FIG. 1(B) shows an electrical system which cooperates with the optical system of FIG. 1(A) for servo-controlling the focusing actuator 24 carrying the objective lens 15. Referring to the drawing, electrical outputs produced by a pair of diagonally disposed photo diodes having the light receiving windows $19a_1$ and $19a_3$ are supplied to an amplifier 21 for amplification and is then supplied to a non-inverting input terminal of a differential amplifier 23. Further, electrical outputs produced by a pair of diagonally disposed photo diodes having the light receiving windows $19a_2$ and $19a_4$ are supplied to an amplifier 22 for amplification and is then supplied to an inverting input terminal of the differential amplifier 23. Thus, the differential amplifier 23 produces an electrical output proportional to the difference in the light received by the windows $19a_1$ and $19a_3$ and the light received by the windows $19a_2$ and $19a_4$. This electrical output is then supplied to the focusing actuator 24 which is an electromagnetic actuator comprising an electromagnetic solenoid 24a, and responsive to the energization of the solenoid 24a by the electrical output of the amplifier 23, the objective lens is moved to and from the disk 16. In other words, the objective lens follows the displacement of the recording plane 16a of the disk 16 and the distance 1 shown in FIG. 1(B) is maintained equal to the focal length of the objective lens 15.

Figure 2A:
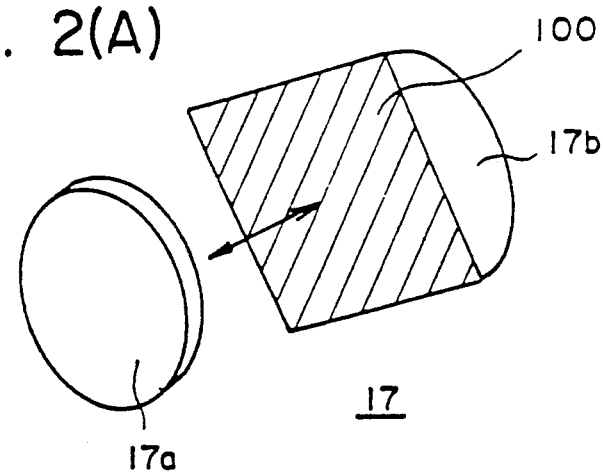
FIG. 2(A) is a diagram showing a process of forming a lens system used in the optical system of FIG. 1(A)
Figure 2B:
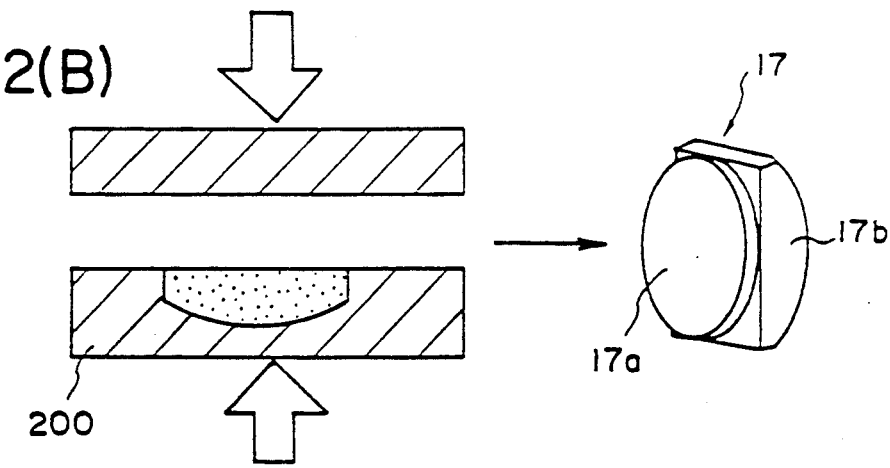
FIG. 2(B) is a diagram showing an alternative process of forming the lens system used in the optical system of FIG. 1(A)
Figure 2C:
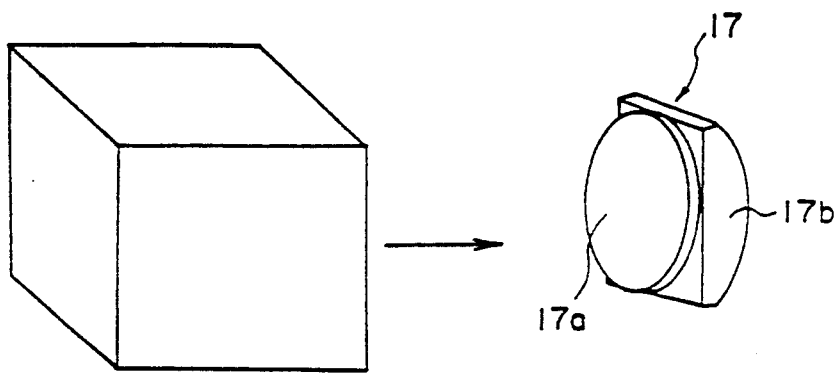
FIG. 2(C) is a diagram showing a still other alternative process of forming the lens system used in the optical system of FIG. 1(A)
Figure 3A:
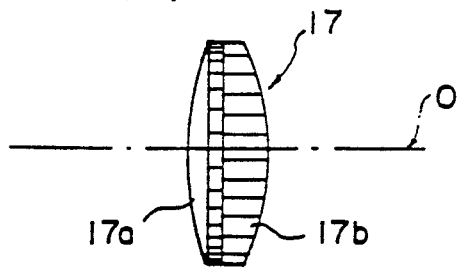
FIGS. 3(A)-(C) are respectively a side view, front view and a top view of a lens system used in the optical system of the present invention.
Figures 3B, 3C:
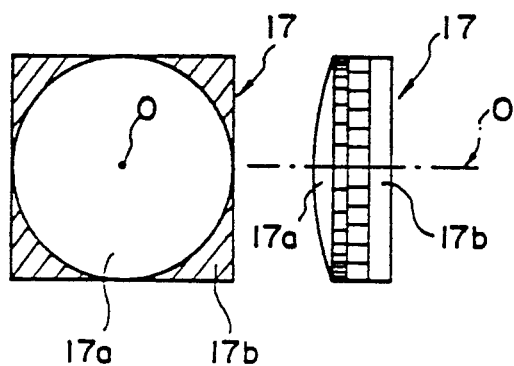

Next, the lens system 17 which constitutes the essential part of the present invention will be described with reference to FIGS. 2(A)-(C). As already described, the lens system 17 comprises a plano-convex lens 17a having 20 a flat plane on one side and a cylindrical lens 17b also having a flat plane on one side, and the lenses 17a and 17b are assembled as a unitary body by jointing the respective flat sides to one another. Preferably, the lens 17a and the lens 17b are glued together by a UV-cure type resin 100 which is cured by irradiation of an ultraviolet radiation and having a refractive index identical to the index of the material forming the lens as shown in FIG. 2(A). Alternatively, the lens system 17 may be made as an integral body from the beginning by pressing a material of the lens in a mould 200 as shown in FIG. 2(B) or by cutting a glass or plastic block 170 to the form of the lens system 17 having a plano-convex part and a cylindrical lens part as shown in FIG. 2(C). In any case, the optical axis of the plano-convex lens 17a and the optical axis of the cylindrical lens 17b are aligned when assembling or cutting the lens system 17. FIG. 3(A) shows the lens system 17 seen from the top. When viewed from this direction, one can see that the cylindrical lens 17b has a convex surface symmetrical about a center line O which defines the optical axis of the lens 17b. In other words, the optical beam transmitted in the plane of the paper in FIG. 3(A) experiences the focusing action of the cylindrical lens 17b. It should be noted that the optical axis O of the cylindrical lens 17b is included in a plane perpendicular to the plane of the paper, and coincides the optical axis of the plano-convex lens 17a. Thus, the optical axis O also defines the optical axis of the lens system 17. It should be noted that the optical path of the optical beam passing through the lens system 17 becomes symmetric about the optical axis O. FIG. 3(B) shows a front view of the lens system 17. In this drawing, the circular plano-convex lens 17a is seen in the front side and the cylindrical lens 17b having a square cross section is seen in the rear side of the lens 17a. FIG. 3(C) shows a side view of the lens system 17. In this view, the convex surface of the cylindrical lens 17b cannot be seen. Thus, the optical beam transmitted in the plane parallel to the plane of the paper in FIG. 3(C) is not subjected to the focusing action of the cylindrical lens 17b.

Figure 4A:
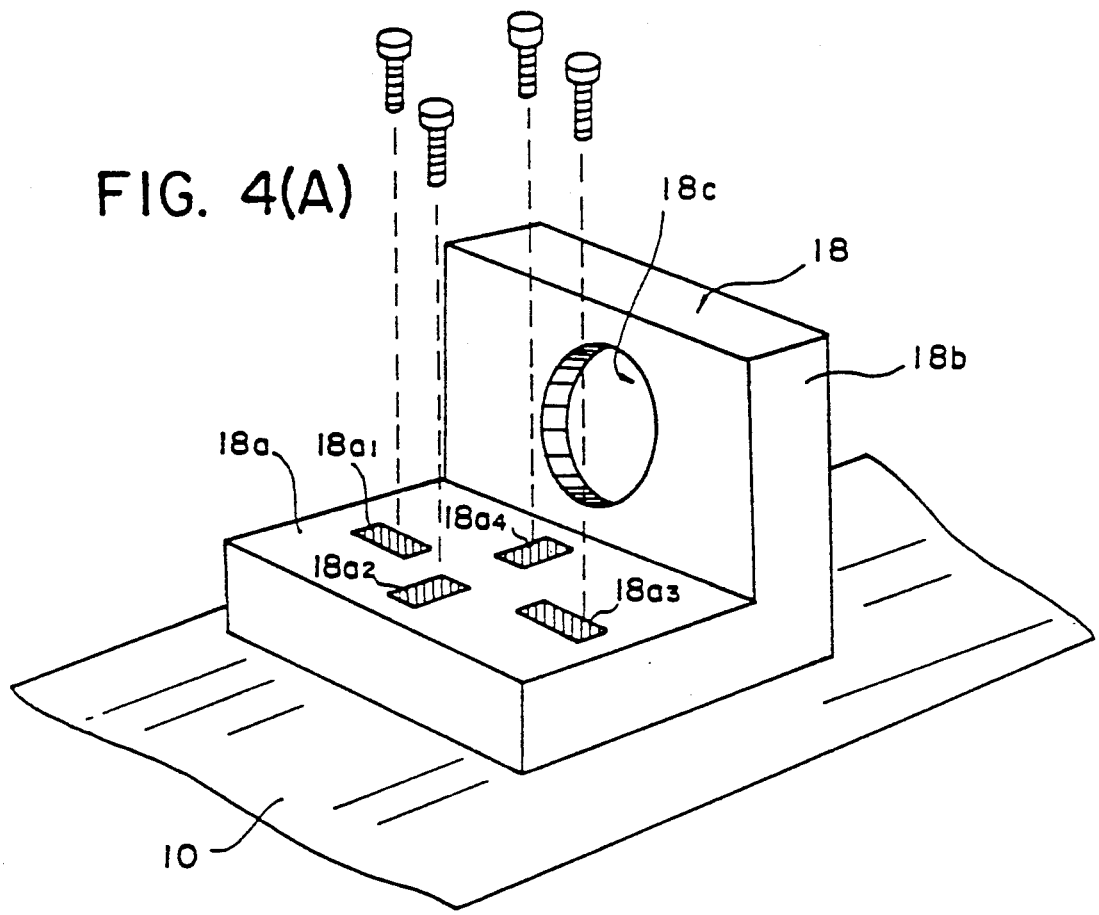
FIGS. 4(A)-(C) are a perspective view, a side view, and a rear view of a holder used for holding the lens system of FIGS. 3(A)-(C)
Figure 4B:
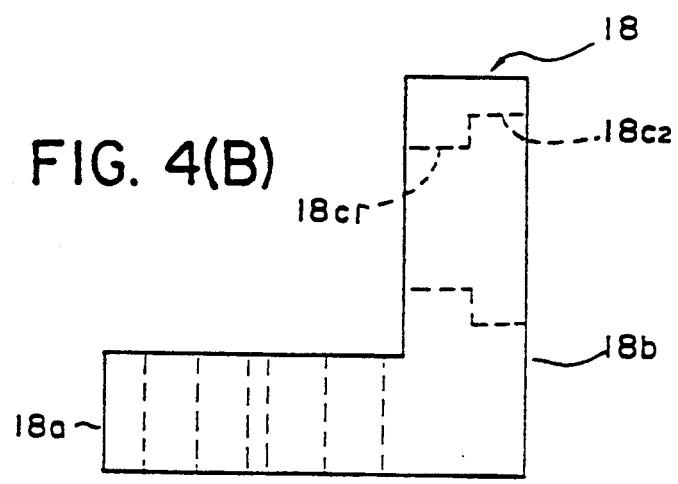

FIG. 4(A) shows the holder 18 for holding the lens system 17. The holder 18 comprises a generally L-shaped body which in turn comprises a base part 18a and a vertical holder part 18b. The base part 18a is provided with elongated penetrating holes $18a_1$–$18a_4$ for accepting mounting screws for mounting the holder 18 on a chassis 10 of the optical recording/reproducing apparatus on which the beam splitter 14 and the quadrant detecting plane 19 are mounted. The holder part 18b of the holder 18 has an opening 18c for accepting the lens system 17 and also for allowing the passage of optical beam passing through the lens system 17. The opening 18c comprises a first circular part $18c_1$ adapted to accept the plano-convex lens part 17a of the lens system 17 and a second circular part $18c_2$ adapted to accept the square shaped cylindrical lens part 17b of the lens system 17. For this purpose, the diameter of the first circular part $18c_1$ is set substantially equal to the diameter of the plano-convex lens 17a and the diameter of the second circular part $18c_2$ is set larger than the diameter of the first lens part $18c_1$ so as to allow entrance of the square shaped cylindrical lens 17b therein. In other words, the diameter of the second circular part $18c_2$ is chosen equal to or larger than the length of the diagonal line of the square-shaped cylindrical lens 17b.

Figure 4C:
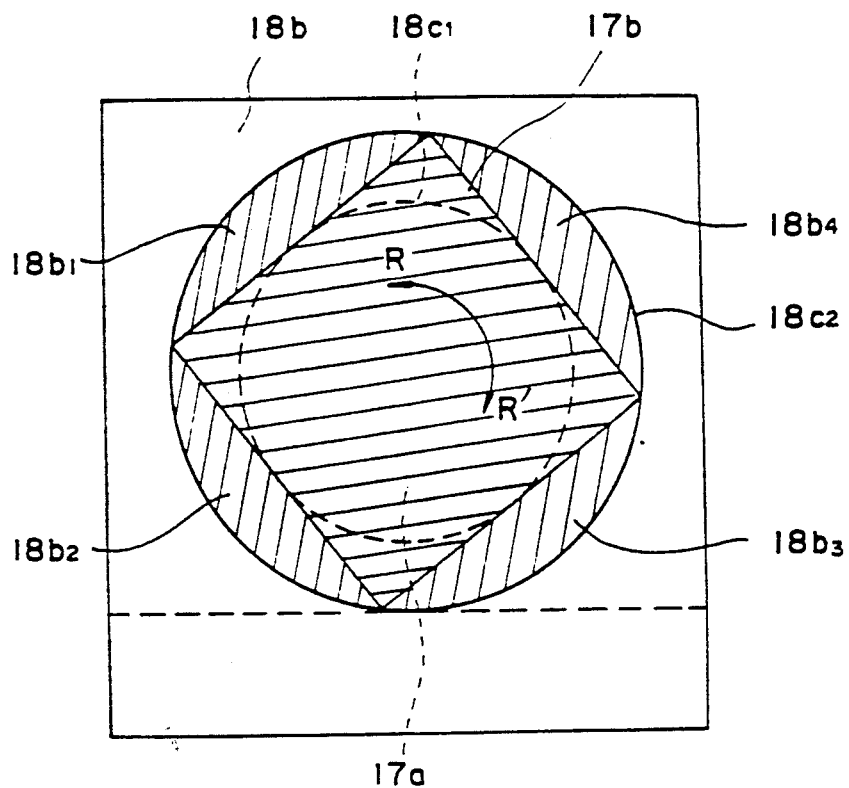

FIG. 4(C) is a rear view of the holder 18 showing a state in which the lens system 17 comprising the plano-convex lens part 17a and the cylindrical lens part 17b is held in the holder 18. As can be seen in the drawing, the plano-convex lens part 17a is received in the first circular part $18c_1$ with narrow tolerance, and the square-shaped cylindrical lens 17b is received in the second circular part $18c_2$. When such a square-shaped cylindrical lens 17b is accommodated in the circular-shaped second circular part $18c_2$ of the opening 18c, four spaces $18b_1$–$18b_4$ shown in FIG. 4(C) appears in the depressed second circular part $18c_2$ on the holder part 18b along respective edges of the lens 17b as shown in FIG. 4(C).

These spaces $18b_1$–$18b_4$ may be used for accepting an adjusting tool when adjusting the angle or orientation of the cylindrical lens relative to the quadrant detecting plane 19 as will be described by rotating in the direction shown by arrows R, R' about the optical axis O of the lens system 17. When adjusting the orientation of the cylindrical lens 17b relative to the orientation of the quadrant detecting plane 19 of the photo diode array by rotating the lens 17b in the directions R or R', it is advantageous to hold the holder 18 horizontal such that the second circular part $18c_2$ faces upwards. In this state, the unitary lens system 17 is inserted into the opening 18c from upwards with such an orientation that the cylindrical lens part 17b faces the upward direction. In this procedure, the four corners of the square-shaped cylindrical lens 17b extending beyond the circular boundary of the plano-convex lens 17a are abutted to the bottom of the second circular part $18c_2$ and the lens system 17 is held stably in the holder 18. Further, the plano-convex lens part 17a engaged with the first circular part $18c_1$ may be used as a guide member when rotating the lens system 17 in the directions R and R'. Thus, one can freely rotate the lens system 17 on the holder 18 in the directions R and R' until a proper angle or orientation of the lens system 17 is established relative to the holder 18. As the holder 18 is mounted on the optical recording/reproducing apparatus with a predetermined relationship with the quadrant detecting plane, the angular relationship between the lens system 17 and the quadrant detecting plane is maintained when the lens system is mounted on the optical recording/reproducing apparatus together with the holder 18. When the proper orientation of the lens system 17 on the holder 18 is established, the lens system 17 may be fixed on the holder 18 by curing the UV-cure resin applied on the bottom of the depressed second circular part $18c_2$ by an ultraviolet radiation or other suitable fixture.

Figure 5:
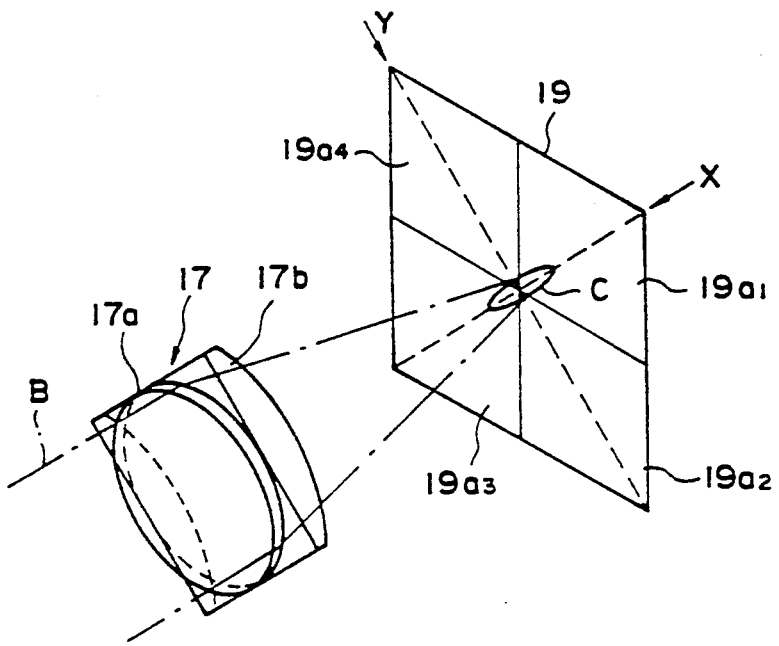
FIG. 5 is a diagram showing a state of the optical system of FIG. 1 in which the proper focusing of the optical beam on an information recording disk is lost due to a too short distance between the lens system and the disk.
Figure 6:
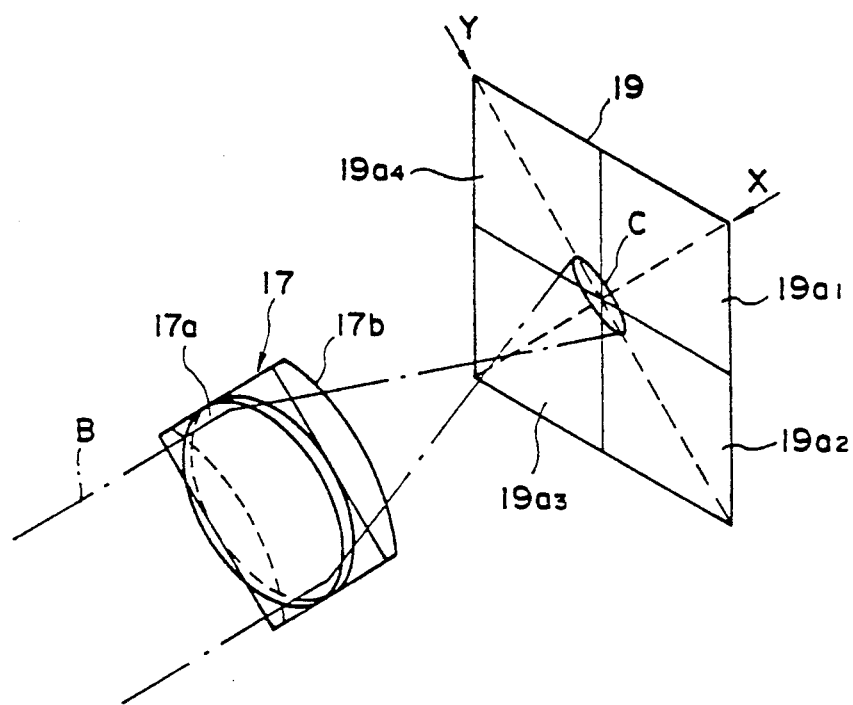
FIG. 6 is a diagram similar to FIG. 5 showing another state in which the proper focusing of the optical beams on the information recording disk is lost due to a too long distance between the lens system and the disk.

The angular relationship of the lens system 17 and the quadrant detecting plane 19 of the photo diode array is set such that when the proper focusing of the optical beam on the disk is lost due to the too short distance between the objective lens 15 and the disk 16, an ecliptical beam spot extending in the diagonal direction of the quadrant detecting plane 19 as shown in FIG. 5 appears and such that when the proper focusing of the optical beam on the disk is lost due to the too long distance between the objective lens 15 and the disk 16, another ecliptical beam spot extending in the other diagonal direction of the quadrant detecting plane 19 as shown in FIG. 6 appears. The direction of elongation of the ecliptical beam spot on the quadrant detecting plane 19 is determined by the angle or orientation of the cylindrical lens part 17b of the lens system 17 relative to the orientation of the quadrant detecting plane 19. As already described, this orientation of the cylindrical lens 17b can be easily adjusted by rotating the lens system 17 in the directions R and R' about the optical axis O while holding it on the holder 18.

Figure 7:
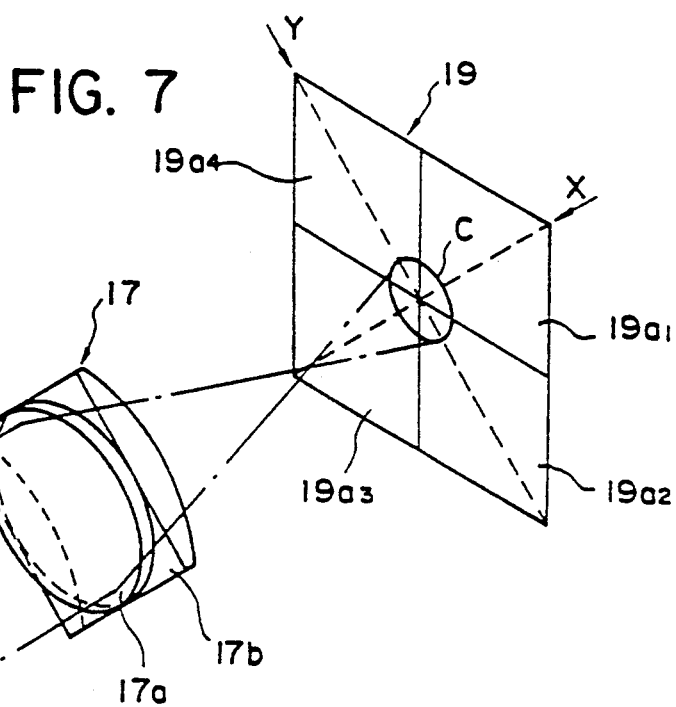
FIG. 7 is a diagram showing a state in which an optical beam is properly focused on the disk.

Further, the lens system 17 is adjusted its distance between the quadrant detecting plane 19 by moving the holder 18 holding the lens system 17 such that a circular beam spot as shown in FIG. 7 appears on the quadrant detecting plane 19 when the distance between the objective lens 15 and the recording plane of the disk 16 is equal to the focal length of the objective lens 15 and the optical beam is properly focused on the disk 16. In this procedure, one only adjusts the distance between the holder 18 and the quadrant detecting plane 19 and the complicated iterative procedure hitherto required in the conventional optical system using separate plano-convex lens and cylindrical lens is eliminated.

Further, the alignment of the optical axes of the plano-convex lens 17a, the cylindrical lens 17b and the quadrant detecting plane 19 such that an optical beam passing through the center of the plano-convex lens 17a perpendicularly to the plane of the lens 17a is directed straight to the center of the quadrant detecting plane comprising the row and column formation of the windows $19a_1$–$19a_4$ is easily established as a result of the unitary construction of the lens system 17, as the necessity to establish the alignment of the optical beam between the plano-convex lens, cylindrical lens and the quadrant detecting plane of the photo diode array individually by iterative procedure is eliminated. It should be noted that the optical axes of the plano-convex lens and the cylindrical lens are aligned at the time of assembling or manufacturing of the lens system 17.

Further, various variations and modifications may be made without departing from the scope of the present invention.

What is claimed is:

1. A focusing control system for an optical recording/reproducing apparatus recording and/or reproducing an information signal on and from a rotary recording medium by means of an optical beam, for producing an electrical signal indicating a state of focusing of the optical beam on the rotary recording medium, comprising:
   a lens system having a plano-convex lens part and a cylindrical lens part formed as a unitary body such that an optical axis of the plano-convex lens part and an optical axis of the cylindrical lens part coincide with an optical axis of the lens system for receiving an incident optical beam reflected by the rotary recording medium at its one side and for transmitting the optical beam thus received to the other side of the lens system;
   a quadrant detecting plane disposed so as to receive the optical beam transmitted from said lens system, said quadrant detecting plane comprising four detecting windows of photo detectors arranged in a row and column formation, each of said photo detectors producing an output electrical signal when an optical beam transmitted from the lens system is irradiated on its detecting window; and
   a lens holder for holding the lens system, said lens holder having a circular opening comprising a first circular opening part having a first diameter for receiving the plano-convex lens part of the lens system and a second circular opening part having a second diameter for receiving the cylindrical lens part of the lens system.

2. A focusing control system as claimed in claim 1 in which said lens system is formed by a plano-convex lens having a flat surface at its one side and forming the plano-convex lens part and a cylindrical lens having a flat surface at its one side and forming the cylindrical lens part, said plano-convex lens and said cylindrical lens being glued one another at respective flat surfaces.

3. A focusing control system as claimed in claim 1 in which said lens system is formed from a single block of material.

4. A focusing control system as claimed in claim 1 in which said cylindrical lens part is configured to have a substantially square cross section when viewed in a direction of the optical axis of the lens system.

5. A focusing control system as claimed in claim 4 in which said cylindrical lens part is configured such that the length of an edge of said square-shaped cross section of the cylindrical lens part is substantially equal to a diameter of the plano-convex lens part.

6. A focusing control system as claimed in claim 1 in which said first diameter is substantially equal to a diameter of said plano-convex lens part, and said second diameter is substantially larger than said first diameter.

7. A focusing control system as claimed in claim 1 in which said cylindrical lens part has a generally square cross section when viewed from a direction of the optical axis of the lens system, and said second diameter is set substantially equal to or larger than a length of the diagonal line of said substantially square-shaped cross section of the cylindrical lens part.

* * * * *